United States Patent [19]
Rasmussen

[11] Patent Number: 5,161,592
[45] Date of Patent: Nov. 10, 1992

[54] METHOD AND APPARATUS FOR FORMING RADIUS CORNERS

[76] Inventor: Henry G. Rasmussen, 23430 Margarita, Detroit, Mich. 48219

[21] Appl. No.: 780,258

[22] Filed: Oct. 21, 1991

Related U.S. Application Data

[63] Continuation of Ser. No. 649,023, Feb. 1, 1991, Pat. No. 5,058,640, which is a continuation of Ser. No. 470,070, Jan. 25, 1990, Pat. No. 5,002,107.

[51] Int. Cl.⁵ .......................... B27M 1/08; B27M 3/00
[52] U.S. Cl. ...................................... 144/367; 83/452; 144/134 R; 144/137; 144/144 R; 144/145 R; 144/144.5; 144/154; 144/372; 269/56; 269/290; 269/305
[58] Field of Search ................. 144/3 R, 48, 137, 139, 144/144 R, 145 R, 145 A, 154, 363, 365, 367, 371, 372, 134 R, 144 S; 269/55, 56, 57, 228, 289 R, 290, 291, 305; 83/481, 482, 483, 484

[56] References Cited

U.S. PATENT DOCUMENTS

| | | | |
|---|---|---|---|
| 2,682,285 | 6/1954 | Blum | 144/154 |
| 3,215,175 | 11/1965 | Hibner | 144/154 |
| 3,367,375 | 2/1968 | Watson, Jr. | 144/154 |
| 3,739,826 | 6/1973 | Schell | 144/154 |
| 4,327,786 | 5/1982 | Markkula | 269/56 |

Primary Examiner—W. Donald Bray
Attorney, Agent, or Firm—Harness, Dickey & Pierce

[57] ABSTRACT

According to the preferred embodiment of the present invention, a method for forming radius corners from bulkstock is disclosed. The method comprises the step of disposing the bulkstock in a first fixture for securing said bulkstock. A first general radial exterior surface is then formed. The bulkstock is then disposed in a second fixture for securing the bulkstock. Finally, a second generally radial posterior surface is formed on the bulkstock. Additional fixtures which are disclosed wherein may also be used.

20 Claims, 5 Drawing Sheets

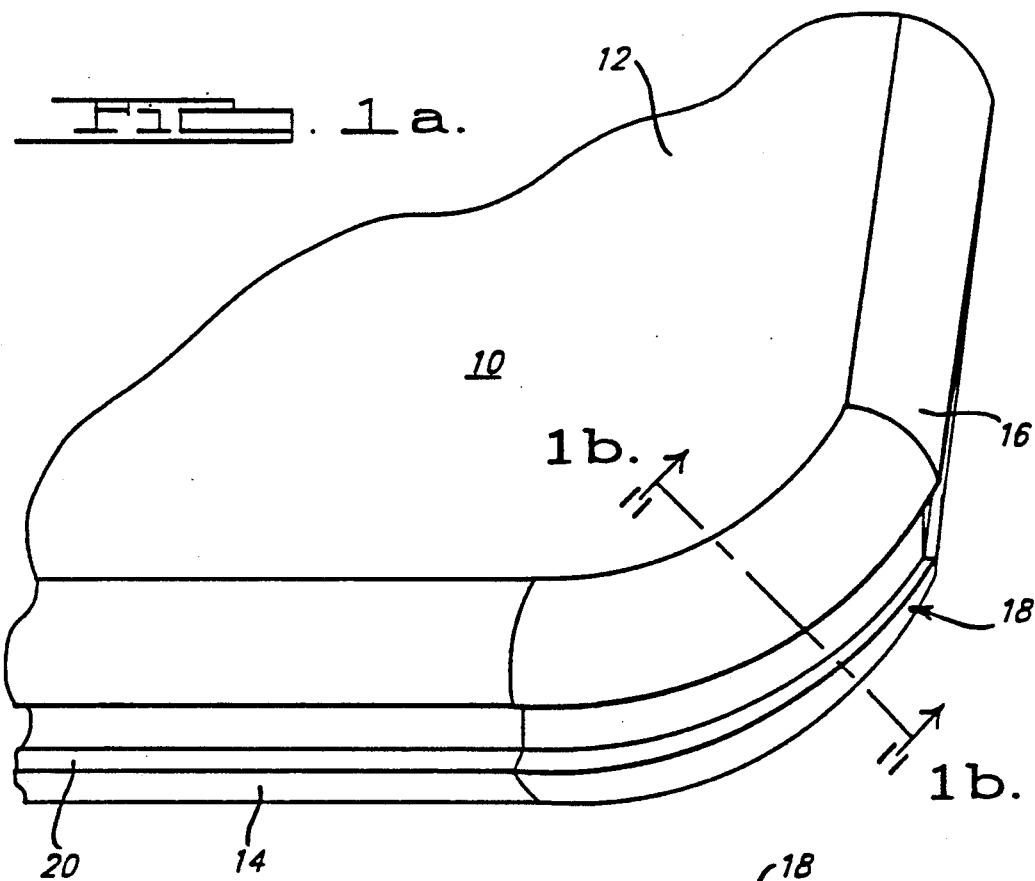
FIG. 1a.
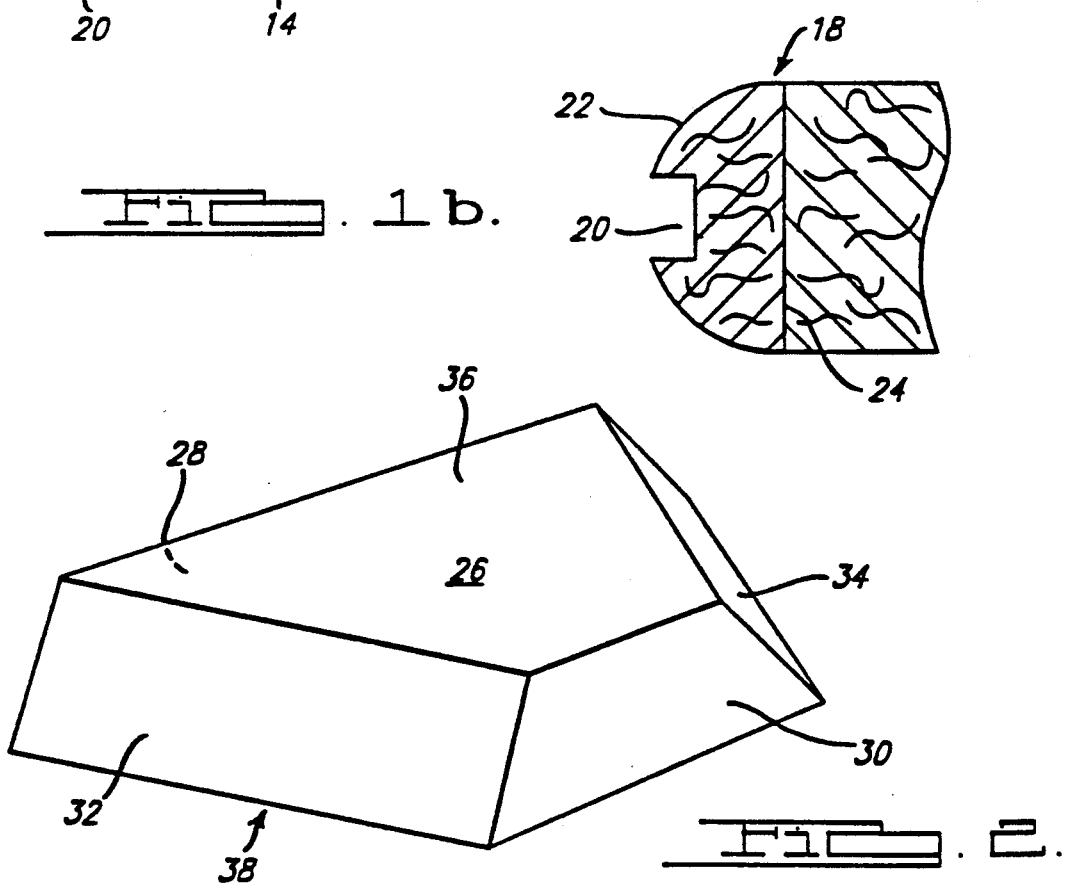
FIG. 1b.
FIG. 2.

METHOD AND APPARATUS FOR FORMING RADIUS CORNERS

This is a continuation of U.S. patent application Ser. No. 649,023, filed Feb. 1, 1991 entitled; METHOD AND APPARATUS FOR FORMING RADIUS CORNERS which issued Oct. 22, 1991 as U.S. Pat. No. 5,058,640, which is a continuation now U.S. Pat. No. 5,002,107 issued Mar. 26, 1991.

BACKGROUND OF THE INVENTION

1. Field of the Invention

This invention relates to the fabrication of furniture and the like, and more particularly concerns the method and apparatus for performing radius corners.

2. Description of the Related Art

In the manufacture of furniture such as tables, countertops and other similar items, it is often desirable to place moldings around the edges of a generally planar surface. The purpose of such moldings is to cover the edges of the base material of the table which may be a composition board material. In addition, such moldings often improve the wear resistance of the table, as well as enhance the aesthetic appearance of the table.

When moldings are used in this manner, it is often necessary to fabricate radius corners which are able to accommodate the corners of the table. However, the formation of such radius corners is often very difficult. One method for forming radius corners is to first cut a piece of bulkstock to the general shape of the corner of the table top, and then sequentially sand and measure the radius corner until a proper fit is attained. Another method for forming a radius corner is to first form the inside surface of the radius corner and then attach the inside surface of the bulkstock to the corner of the table by means of an adhesive. Once the adhesive has hardened, the bulkstock may be machined sanded and finished to match the remainder of the molding which will be used to form the table.

While the method described above have been generally successful in forming radius corners, they often have several disadvantages. First, such methods for forming radius corners are often time consuming, requiring the craftsman to spend a substantial amount of time in machine set-up, shaping, sanding and then trimming the radius corner to get the proper fit. This procedure becomes even more difficult when the radius corner is to match profiled linear molding having a bullnose, bevel groove which can eventually contain decorative strip. Furthermore, if the bulkstock were first attached to the corner of the table before machining the profile, the entire table would generally have to be moved so that a profile could be formed on the exterior surface of the radius corner, or machined with a portable router with bearing guide tooling or special fixturing to guide the router. This could also limit the accuracy of the radius corner profile to the linear molding by use of standard router bits available.

SUMMARY OF THE INVENTION

According to the preferred embodiment of the present invention, a method for forming radius corners from bulkstock is disclosed. The method comprises the step of disposing the bulkstock in a first fixture for securing said bulkstock. A first general radial exterior surface is then formed. The bulkstock is then disposed in a second fixture for securing the bulkstock. Finally, a second generally radial posterior surface is formed on the bulkstock. Additional fixtures which are disclosed herein may also be used.

BRIEF DESCRIPTION OF THE DRAWINGS

Various advantages of the present invention will become apparent to one skilled in the art upon reading the following specification and reference to the following drawings in which:

FIG. 1a is a perspective view, as well as a cross-sectional view, of the radius corner formed according to the preferred embodiment of the present invention;

FIG. 1b is a cross-sectional view of the corner molding shown in FIG. 1a;

FIG. 2 is a perspective view of the bulkstock which is used to form the radius corner;

FIG. 3a is a perspective view of a first fixture for securing the bulkstock when the outside radius of the bulkstock is cut;

FIG. 3b is a view of the underside of the fixture shown in FIG. 3a;

FIG. 5a is a perspective view of a fixture for cutting the inside radius of the bulkstock;

FIG. 5b is an elevational view of the bottom of the fixture shown in FIG. 5a;

DESCRIPTION OF THE PREFERRED EMBODIMENT

Figure 3:
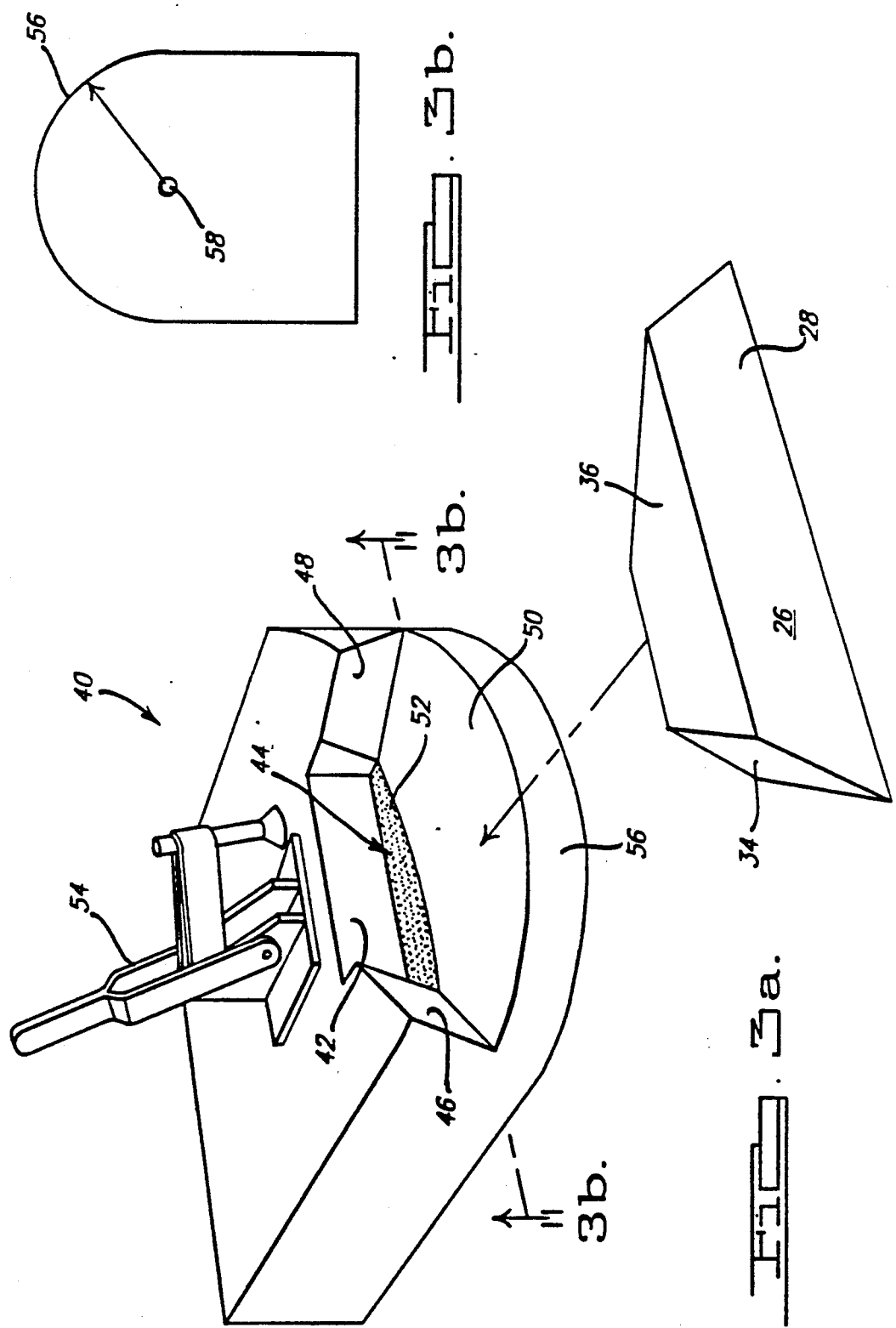

Referring to FIG. 1, a table is shown which is generally designated by the numeral 10. The table 10 may have a top surface 12 which is wood, though it may also have a surface which is laminated to a base material. Disposed along the periphery of the table are two linear molding sections 14 and 16 as well as a radius corner molding 18. The linear molding sections 14 and 16 and the radius corner molding 18 are used to enhance the appearance of the table 10 as well as to improve the wear characteristics of the table 10. While the present invention has been described with reference to a table, it will be understood that the present invention may also be used with other similar surfaces such as drafting tables, countertops, doors, and so forth.

Disposed along the longitudinal periphery of the linear molding sections 14 and 16 as well as the radius corner molding 18 is a longitudinal groove 20. The longitudinal groove 20 may be used to secure decorative molding strips which also enhance the attractiveness of the table 10. The cross-section of the linear molding sections 14 and 16 as well as the radius corner molding 18 is essentially semicircular. That is, the radius corner molding 18 has a general circular anterior surface 22 as well as a relatively planar posterior surface 24. It is to be understood, however, that other suitable cross-sections may be used. The linear molding sections 14 and 16 and the radius corner molding 18 may be secured to the table 10 in suitable manner such as by the use of an adhesive. In addition, the posterior surface 24 of the radius corner molding 18 may have a projection (not shown) which is operable to engage a groove in the table.

The radius corners similar to radius corner molding 18 have been difficult to mass produce because of the difficulty in securing bulkstock from which it is made during manufacture. The term "bulkstock" is meant to include wood, solid surfacing material such as CORIAN or FOUNTAIN HEAD, or other suitable materials, Accordingly, radius corner moldings similar to the radius corner molding 18 were generally formed by securing the bulkstock to the corner of the table and then forming the cross-sectional surface of the corner radius molding. Because radius corner moldings could not generally be formed without being secured to the table with which it was to be used, it was not generally possible to premanufacture radius corner moldings in large quantities.

In contrast, the present invention allows for the premanufacture of radius corner moldings in relatively large quantities. This is made possible by the method disclosed herein which permits bulkstock to be secured during machining.

According to the present invention, a bulkstock is used which is generally designated by the numeral 26. The bulkstock 26 has a first surface 28 which will be shaped into the first anterior radial surface 22 of the radius corner molding 18, and has a second surface 30 which will be shaped to form the second posterior radial surface 24 of the radius corner molding 18. In addition, the bulkstock has third and fourth surfaces 32 and 34 which each have a 45°×15° compound angle. That is, the compound angle is 45° from the first surface 28 and is 15° between the upper surface 36 and the lower surface 38 of the bulkstock 26. It is to be understood, however, that other compound angles may be used.

To provide first means for securing the bulkstock 26 when the first surface 28 is being cut, a fixture 40 is provided as shown in FIG. 3. The fixture 40 is generally rectangular in shape and may be formed from either wood, aluminum, steel or other suitable materials.

The fixture 40 includes a back support surface 42 which extends approximately half way through the thickness of the fixture 40, thereby forming a recess 44 which is operable to engage the bulkstock 26. Connecting the back support surface 42 of the fixture 40 to the perimeter of the fixture 40 are the angular side support surfaces 46 and 48. The angular side support surfaces 46 and 48 extend from the back support surface 42 to the perimeter of the fixture 40 and are angulated in a manner so as to correspond to the compound angles in the third and fourth surfaces 32 and 34 of the bulkstock 26. In addition, the back support surface 42 is also connected to the bottom support surface 50 which contains an abrasive non-slip surface 52 to assist in stabilizing the bulkstock 26 when the bulkstock 26 is disposed within the recess 44.

The recess 44 of the fixture 40 is able to engage the bulkstock 26 in the following manner. The first angular side support surface 46 of the fixture 40 engages the fourth surface 34 of the bulkstock 26, while the second angular side support surface 48 engages the third surface 32 of the bulkstock 26. When the bulkstock 26 is disposed within the recess 44 of the fixture 40, it is automatically centered by compound angles and then may be secured within the recess 44 by a clamp 54. The clamp 54 may be Destaco part number 207 or 207UL, though other suitable clamps may be used. In addition, more than one clamp 54 may be used if additional support is necessary.

Figure 4:
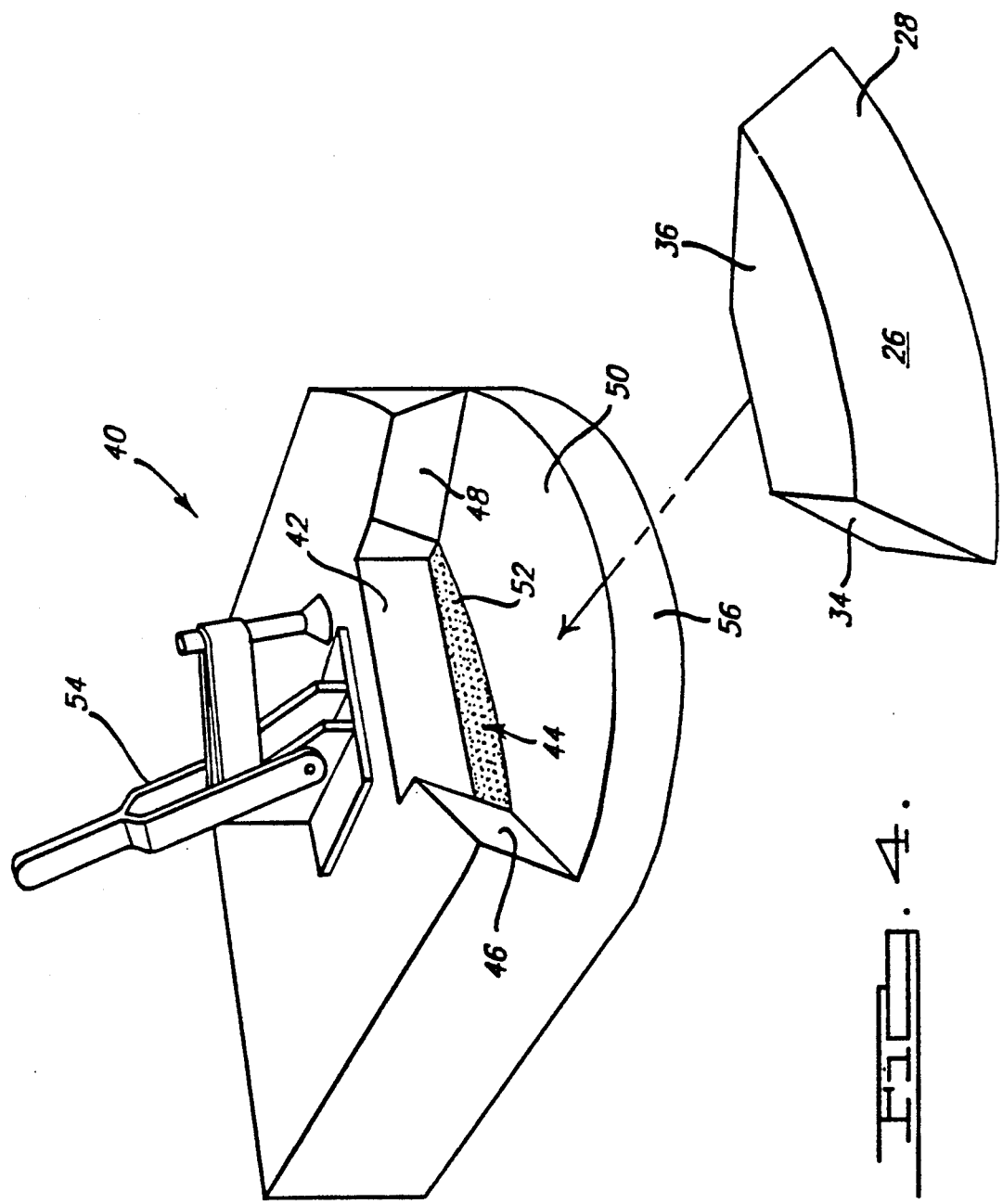
FIG. 4 is a perspective view of fixture shown in FIG. 3 which allows formation of a face profile on the bulkstock.

The fixture 40 has a radial perimeter section 56 and a locating hole 58 shown in FIG. 3b. The locating hole 58 is used to engage a pin (not shown) which is on the table of a bandsaw or suitable device so as to allow the fixture 40 to rotate. Accordingly, upon rotation of the fixture 40, the first surface of the bulkstock can be radially cut. The radial perimeter section 56 allows for this rotational movement of the fixture 40 without damage to the fixture 40. A shaper or an overhead router may then be used to form the first anterior radial surface 22 of the corner radius 18 while the bulkstock 26 is being held in the fixture 40 or in a fixture similar to the fixture 40. This is shown in FIG. 4. In the typical manufacturing environment, however, two of the fixtures 40 will be used.

Figure 5:
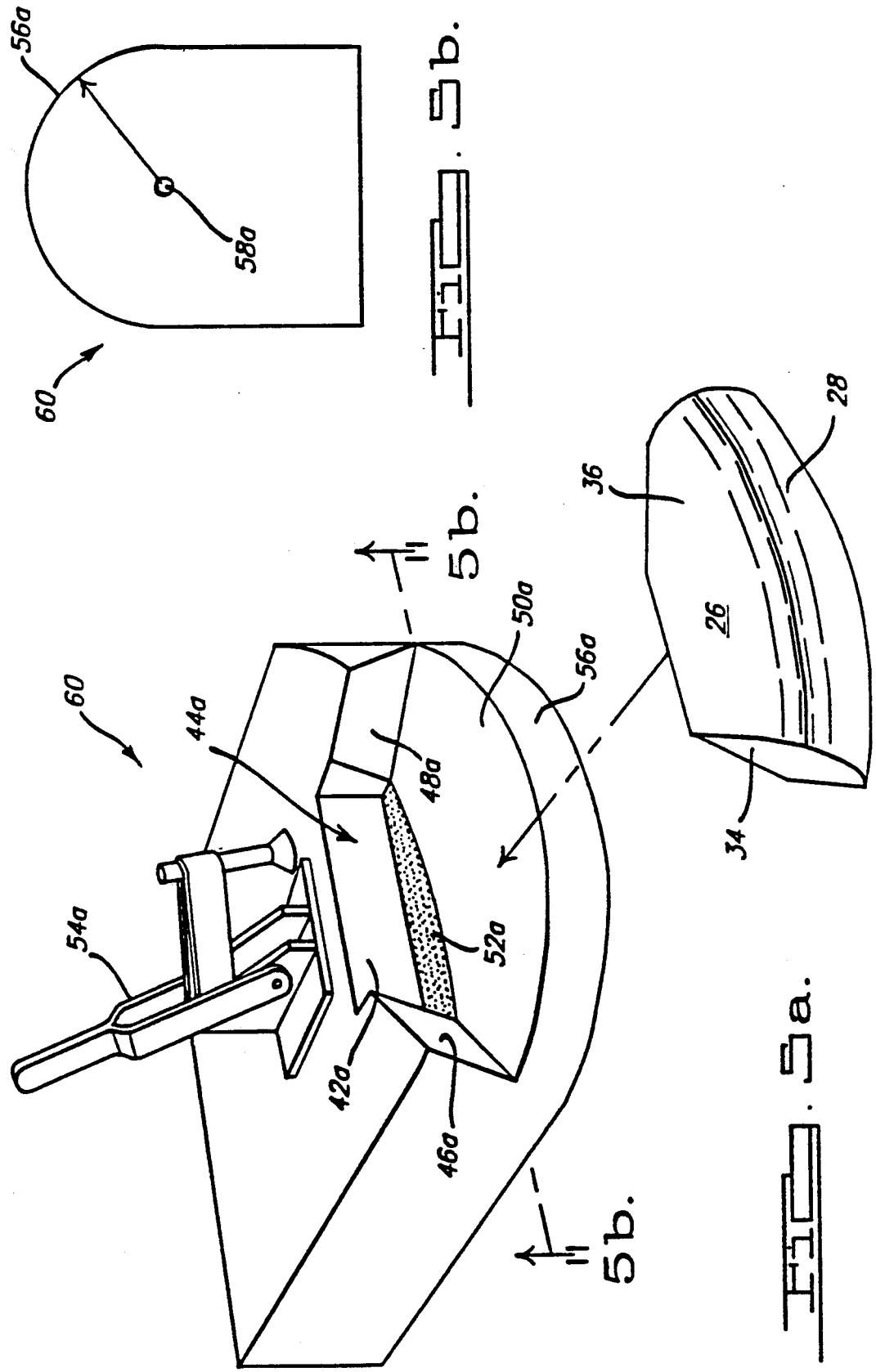

After a radial cut has been made in the first surface 28 of the bulkstock 26 and has been finished by a shaper, the bulkstock 26 is removed from the first fixture 40 and then secured to a second fixture which is generally designated by the numeral 60 in FIG. 5. The fixture 60 is similar to the fixture 40, and similar elements have ben given the same number as that appearing in FIG. 4 with respect to the fixture 40, but having a suffix "a" in addition. In contrast, however, the distance between the radial perimeter section 56a and the back support surface 42a of the fixture 60 is less than that associated with the fixture 40 so as to permit a greater amount of the bulkstock 26 to overhand the recess 44a. Once the bulkstock 26 is secure within the fixture 60, the fixture 60 may be rotatably placed on a bandsaw table so as to but that portion of the bulkstock 26 that is overhanging the radial perimeter section 56a to form roughly the posterior radial surface of the radius corner molding 18.

Figure 6:
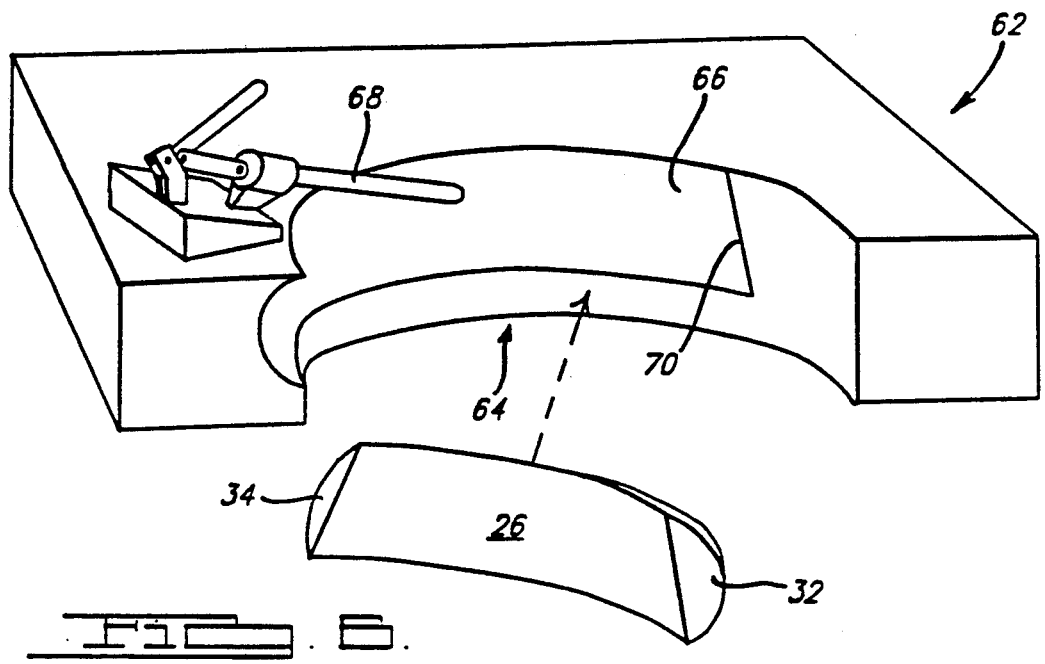
FIG. 6 is a perspective view of a fixture for securing the bulkstock while the inside radius of the bulkstock is being finished.

To smooth the posterior radial surface 24 of the radius corner molding 18, a third fixture 62 is used as shown in FIG. 6. The fixture 62 has a generally rectangular base with a horseshoe-shaped recess 64. The horseshoe-shaped recess 64 comprises a groove 66 which is semicircular in cross-section and is able to accommodate the machined first surface 28 the bulkstock 26. In addition, the fixture 62 may have a top layer which is formed from a transparent material such as Plexiglas to facilitate viewing the bulkstock 26 during manufacturing.

To secure the bulkstock 26 within the groove 66, a clamp 68 is used. The clamp 68 applies a force against the fourth surface 32 of the bulkstock 26 so as to force the third surface 34 against an angulated groove terminating surface 70 in the groove. The groove terminating surface 70 is angulated so as to engage the compound angle associated with the third surface 34 of said bulkstock 26. In addition, a clamp 68 is disposed perpendicularly to the fourth surface 36 of the bulkstock 26 so as to secure the bulkstock within the groove 66. While the clamp 68 may be Destaco Model No. 603, other suitable clamps may be used.

Once the bulkstock 26 is secured in the fixture 62, the fixture 62 may be rotated around a shaper or an overhead router (not shown) so as to shape the second surface 30 of the bulkstock 26 to form the posterior radial surface 24 of the radius corner molding 18. In doing so, a bearing guide (not shown) may be used so as to locate the shaper cutter with respect to the fixture 62.

Figure 7:
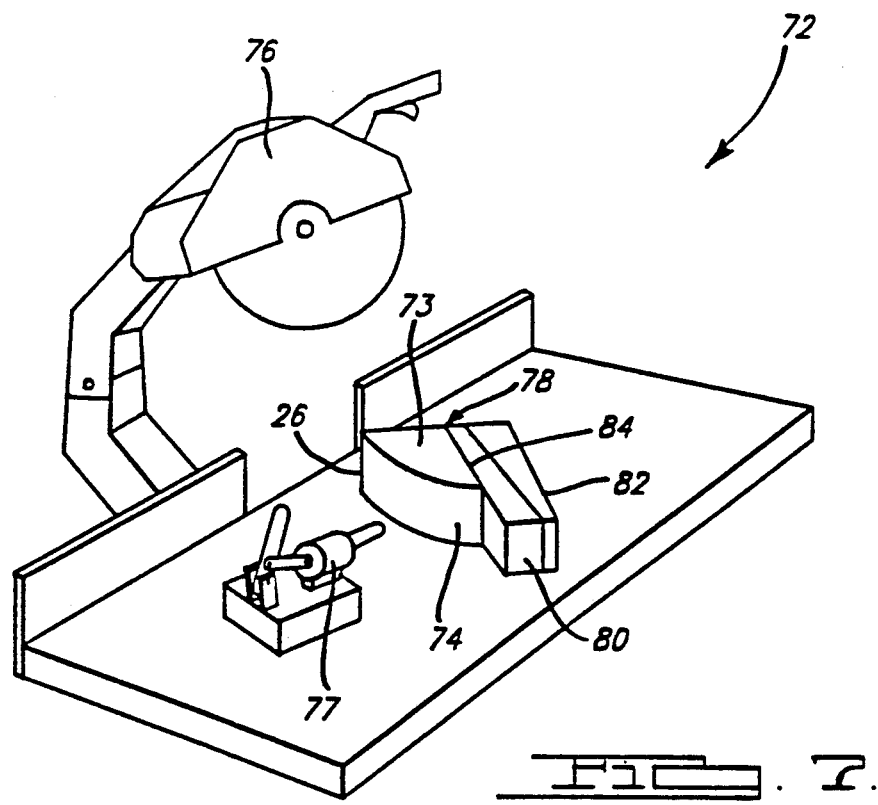
FIG. 7 is a perspective view of the fixture for forming 90° angles on the bulkstock.

After the second surface 30 of the bulkstock 26 is shaped to form the posterior radial surface 24 of the radius corner molding 18, the third and fourth surfaces 32 and 34 of the bulkstock 26 have to be cut so that they will become perpendicular to each other and are therefore able to mate with the linear molding sections 14 and 16. To cut the third and fourth surfaces 32 and 34 of the bulkstock perpendicularly, the fixture 72 shown in FIG. 7 may be used. The fixture 72 comprises a bulkstock support member 73 having an arcuate surface 74 which is able to engage the second surface 30 of the bulkstock 26. Disposed on the bulkstock support member 73 is a first clamp 77 which is able to downwardly secure the bulkstock 26 when placed against the arcuate surface 74 of the support member 72. While the first clamp 76 may be a Destaco part No. 207 or 207UL, other suitable clamps may be used.

The fixture 72 also comprises a second clamp 78 which is used to exert a force against the first surface 28 of the bulkstock 26 so as to force the bulkstock 26 against the arcuate surface 74 of the bulkstock support member 73. The third surface 32 of the bulkstock 26 is then trimmed by means of a saw 76 which is perpendicular to a first planar surface 78 of the support member 73. The bulkstock 26 is then rotated 180° so as to allow the saw 76 to cut the fourth surface 34 of the bulkstock 26.

The fixture 72 also comprises a wedge 80 and a wedge support member 82. When the wedge 80 and wedge support member 82 are disposed against a second planar surface 84 of the bulkstock support member 73, the fourth surface 34 of the bulkstock 26 may be cut in the desired manner. It will be noted that the bulkstock 26 is placed adjacent to the wedge 80 only when the fourth surface 34 of the bulkstock 26 is being cut.

The entire process of forming the radius corner molding 18 will now be described. The bulkstock 26 is first formed with the third and fourth surfaces 32 and 34 having compound angles as shown in FIG. 2. The bulkstock 26 is then inserted into the fixture 40 so that the second surface 30 is adjacent to the back support surface 42 of the fixture 40, while the third and fourth surfaces 32 and 34 of the bulkstock 26 are disposed against the second and first angular side support surfaces 48 and 46 of the fixture 40, respectively. The clamp 54 is then positioned so as to secure the bulkstock 26 within the fixture 40. The fixture 40 is then rotated on a bandsaw table (not shown) so as to form a radial surface on the first surface 28 of the bulkstock 26.

The bulkstock 26 is then removed from the fixture 40 and then transported to another fixture which is substantially identical to the fixture 40. A shaper or router is then used to shape the first surface 28 of the bulkstock 26 to form what will become the profile of the anterior surface 22 of the radius corner molding 18.

The bulkstock 26 is then removed and placed in the fixture 60 in a manner similar to that which was described above in connection with use of the fixture 40. A bandsaw is then used to cut through the upper surface 36 of the bulkstock 26 so as to form a radial surface on the first surface 28 of the bulkstock 26. The bulkstock 26 is then removed from the fixture 60 and placed in the fixture 62 with the first surface 28 of the bulkstock 26 disposed adjacent to the groove 66, as well as having the third surface 32 of the bulkstock 26 adjacent to the groove terminating surface 70. The clamp 68 is then used to secure the bulkstock 26 within the groove 66, and then a shaper (not shown) with a bearing guide may be used to finish the second surface 30 so as to form the posterior surface 24 of the radius corner molding 18. The bulkstock 26 is then removed from the fixture 62 and placed in the fixture 72, with the second surface 30 of the bulkstock 26 adjacent to the arcuate surface 674 of the bulkstock support member 763. The clamp 77 then engages the first surface 28 of the bulkstock 26 so as to stabilize the bulkstock 26 when the fourth surface 34 of the bulkstock is cut by the saw 76. The clamp 77 is then released, the bulkstock rotated 180°, the wedge 80 inserted between the bulkstock support member 73 and the support member 82 and then the saw 76 is used to cut the third surface 32 of the bulkstock. By cutting the first and second surfaces 28 and 30 in this manner, the first and second surfaces 28 and 30 will become perpendicular.

It should be understood that the invention has been described in connection with a particular example thereof. Other examples will include various modifications to the structure described above including replacement of the clamps by hydraulic clamps, as well as the use of robotics. Other modifications will become apparent to those skilled in the art after a study of the specification, drawing and following claims.

What is claimed is:

1. A radius corner formed from bulkstock having first and second surfaces by a process comprising the steps of:
   disposing said bulkstock in a first means for securing said bulkstock;
   forming a first generally radial surface on the first surface of said bulkstock;
   removing said bulkstock from said first means for securing said bulkstock;
   disposing said bulkstock in a second means for securing said bulkstock; and
   forming a second generally radial profile surface on the second surface of said bulkstock.

2. The radius corner formed by the process of claim 1 wherein said bulkstock has third and fourth surfaces, said process further comprising the step of forming a compound angle on the third and fourth surfaces of said bulkstock.

3. The radius corner formed by the process of claim 2 wherein said first means for securing said bulkstock includes a back support surface and first and second angular side support surfaces, said back support surface operable to support the second surface of said bulkstock while said first and second angular side support surfaces are operable to engage the third and fourth surfaces of said bulkstock.

4. The radius corner formed by the process of claim 3 wherein the step of forming a first generally radial surface on the first surface of said bulkstock includes the step of rotating said first means for securing said bulkstock.

5. The radius corner formed by the process of claim 4 wherein said second means for securing said bulkstock includes the back support surface as well as first and second angular side support surfaces, the step of disposing said bulkstock in said second means for securing said bulkstock includes the step of causing the third and fourth surfaces of the bulkstock to substantially engage the first and second angular side support surfaces of said second means for securing said bulkstock.

6. The radius corner formed by the process of claim 5 wherein the step of forming a second radial surface on said bulkstock includes the step of rotating the second means for supporting said bulkstock.

7. The radius corner formed by the process of claim 6 wherein the step of forming a second generally radial surface includes the step of disposing said bulkstock in a third means for supporting said bulkstock.

8. The radius corner formed by the process of claim 7 wherein the third means for supporting said bulkstock includes a generally radial groove, and wherein the step of disposing said bulkstock in the third means for supporting said bulkstock includes the step of disposing said first surface of said bulkstock within the radial groove.

9. The radius corner formed by the process of claim 8 wherein the bulkstock includes third and fourth surfaces, at least one of the third and fourth surfaces has a compound angle, and wherein the step of disposing said bulkstock in said radial groove includes the step of causing the compound angle of said bulkstock to engage an angulated groove terminating surface disposed within said radial groove.

10. The radius corner formed by the process of claim 7 wherein said bulkstock includes third and fourth surfaces, and wherein the process further comprises the step of perpendicularly cutting the third and fourth surfaces of said bulkstock by disposing said bulkstock adjacent generally arcuate support surfaces so as to position said bulkstock with respect to a cutting member.

11. A fixture for positioning and supporting bulkstock during the formation of radius corner moldings, said bulkstock including first, second, third, fourth, fifth and sixth surfaces, said fixture comprising:
a front surface formed in a predetermined radius configuration; and
a recess formed in said fixture, said recess being operable to accept said bulkstock, wherein said recess is open to a top surface of said fixture and to said front surface.

12. The fixture according to claim 11 wherein said recess includes a first side support surface and a second side support surface configured at compound angles relative to a bottom support surface of said recess, said first side support surface operable to engage said third surface of said bulkstock and said second side support surface operable to engage said fourth side surface of said bulkstock, said fifth surface of said bulkstock slidable along and supportable by the bottom support surface of said recess.

13. The fixture according to claim 11 further comprising means for allowing said fixture to rotate about a preselected point.

14. The fixture according to claim 11 wherein said recess is configured such that an anterior surface of the radius corner molding can be machined relative to the front surface when the second surface of said bulkstock is engaged with a back support surface of the recess.

15. The fixture according to claim 11 wherein said recess is configured such that a posterior surface of the radius corner molding can be machined relative to the front surface when the second surface of said bulkstock is engaged with a back support surface of the recess.

16. A method for forming radius corners from bulkstock having first and second surfaces, said method comprising the steps of:
positioning said bulkstock in a first means for securing said bulkstock;
forming a first generally radial profile surface on the first surface of said bulkstock; and
positioning said bulkstock in a second means for securing said bulkstock.

17. The method of claim 16 wherein the step of positioning said bulkstock in a first means for securing includes positioning the first surface of the bulkstock against a back support surface associated with the first means for securing and positioning third and fourth surfaces of the bulkstock against opposite side support surfaces associated with the first means for securing, wherein the opposite side support surfaces of the first means for securing are at a predetermined angle relative to a bottom support surface of the first means for securing.

18. The method according to claim 17 wherein the step of forming a first generally radial surface includes rotating the first means for securing such that the radial profile is formed by a cut through the bulkstock following a generally radial profile of a front surface of the first means for securing.

19. The method according to claim 16 wherein the step of positioning said bulkstock in a second means for securing includes the steps of positioning the second surface of the bulkstock in a generally radial groove associated with the second means for securing and positioning a third surface of the bulkstock against a support surface within the groove.

20. The method according to claim 16 further comprising the steps of positioning said bulkstock in a third means for securing said bulkstock, wherein third and fourth surfaces of said bulkstock are disposed adjacent generally arcuate support surface so as to position said bulkstock with respect to a cutting member.

* * * * *